US012594605B2

(12) United States Patent
Schwab

(10) Patent No.: US 12,594,605 B2
(45) Date of Patent: Apr. 7, 2026

(54) MATERIAL BAR MAGAZINE FOR GUIDING MATERIAL BARS ON AN AUTOMATIC LATHE AS WELL AS A SYSTEM CONSISTING OF SUCH A MAGAZINE AND AUTOMATIC LATHE

(71) Applicant: FMB Maschinenbau- gesellschaft mbH & Co. KG, Faulbach (DE)

(72) Inventor: Steffen Schwab, Altenbuch (DE)

(73) Assignee: FMB Maschinenbau- gesellschaft mbH & Co. KG, Faulbach (DE)

( * ) Notice: Subject to any disclaimer, the term of this patent is extended or adjusted under 35 U.S.C. 154(b) by 1145 days.

(21) Appl. No.: 17/520,372

(22) Filed: Nov. 5, 2021

(65) Prior Publication Data

US 2022/0168818 A1     Jun. 2, 2022

(30) Foreign Application Priority Data

Nov. 6, 2020    (DE) .......................... 102020129265.1

(51) Int. Cl.
  B23B 13/02        (2006.01)
  B23Q 7/06        (2006.01)
    (Continued)
(52) U.S. Cl.
  CPC .............. B23B 13/02 (2013.01); *B23B 13/08* (2013.01); *B23B 13/123* (2013.01)
(58) Field of Classification Search
  CPC ..... B23B 13/02; B23B 13/123; B23B 13/126; B23B 7/06; B23B 13/08; B23B 2250/16; B23B 13/10
  See application file for complete search history.

(56) References Cited

U.S. PATENT DOCUMENTS 3,875,830 A * 4/1975 Lechot ................... B23B 13/10
                                    82/126
5,095,789 A * 3/1992 Mukai .................. B23Q 39/044
                                    82/127
(Continued)

FOREIGN PATENT DOCUMENTS

DE        2331032 A1    1/1974
WO    2010/149342 A1    12/2010

OTHER PUBLICATIONS

Search Report issued in counterpart German patent application No. 102020129265.1, Sep. 16, 2021, 12 pp. w/ translation.

*Primary Examiner* — Sara Addisu
(74) *Attorney, Agent, or Firm* — Kaplan Breyer Schwarz, LLP

(57)        ABSTRACT

A material bar magazine for guiding material bars on an automatic lathe and a system having such a magazine and automatic lathe having at least one headstock that is displaceable along a longitudinal axis of the material bar magazine, where the material bar magazine includes a material bar-guiding channel system having a channel opening system. Further, the channel system of the material bar magazine has a first, outer guide channel and a second, inner guide channel mounted inside the first guide channel such that it can move relative thereto along the longitudinal direction, the second, inner guide channel couplable or coupled to the headstock of the automatic lathe so that it synchronously moves the second, inner guide channel as the headstock moves along a longitudinal axis of the material bar magazine, relative to the first guide channel.

14 Claims, 10 Drawing Sheets

(51) Int. Cl.
  *B23B 13/08*        (2006.01)
  *B23B 13/12*        (2006.01)

(56)              References Cited

U.S. PATENT DOCUMENTS

| | | | | |
|---|---|---|---|---|
| 5,322,000 | A * | 6/1994 | Huang | B23B 13/08 |
| | | | | 82/127 |
| 7,124,880 | B2 * | 10/2006 | Lee | B23B 13/10 |
| | | | | 82/126 |
| 7,134,369 | B1 * | 11/2006 | Stevens | B23B 13/04 |
| | | | | 82/124 |
| 7,513,181 | B2 * | 4/2009 | Berns | B23Q 7/00 |
| | | | | 82/126 |
| 8,453,544 | B2 * | 6/2013 | Cucchi | B23B 25/06 |
| | | | | 82/126 |
| 8,573,100 | B2 * | 11/2013 | Schmidt | B23B 7/06 |
| | | | | 82/126 |
| 2005/0111957 | A1 * | 5/2005 | Berns | B23Q 7/00 |
| | | | | 414/745.1 |
| 2012/0090436 | A1 * | 4/2012 | Schmidt | B23B 13/02 |
| | | | | 82/126 |
| 2015/0360294 | A1 | 12/2015 | Cucchi | |
| 2022/0168818 | A1 * | 6/2022 | Schwab | B23B 13/123 |
| 2024/0123510 | A1 * | 4/2024 | Uchiyama | B23B 13/021 |
| 2024/0189913 | A1 * | 6/2024 | Kimura | B23B 1/00 |
| 2024/0189915 | A1 * | 6/2024 | Kimura | B23B 7/06 |

* cited by examiner 14.18

(-Prior Art-)

(-Prior Art-)

(-Prior Art-)

(-Prior Art-)

MATERIAL BAR MAGAZINE FOR GUIDING MATERIAL BARS ON AN AUTOMATIC LATHE AS WELL AS A SYSTEM CONSISTING OF SUCH A MAGAZINE AND AUTOMATIC LATHE

FIELD

The present invention relates to a material bar magazine for guiding material bars on an automatic lathe and to a system consisting of such a magazine and automatic lathe.

BACKGROUND

Automatic lathes for machining bar-shaped semi-finished products, which are referred to below as material bars, in short simply as bars, are known in principle and can be divided into three different designs, the fixed headstock automatic lathes, the sliding headstock automatic lathes and the hybrid automatic lathes.

A fixed headstock automatic lathe, as shown, for example, in FIG. 7, is a device having a fixed headstock 1.1 in which the spindle 1.2 and the drive are mounted. At the end of the spindle on the process chamber side there is a clamping means 1.3, usually a collet 1.3, which can also be a chuck, for example. The spindle has a longitudinal bore 1.11 such that a bar 1.5 can be pushed through the spindle from the back of the headstock via a bar loader 1.4, preferably a bar loading magazine 1.4, with the aim of machining the bar end 1.6. This bar end 1.6 is clamped in the collet 1.3 in such a way that a projection 1.7, which substantially corresponds to the workpiece length, protrudes into the process chamber 1.8. All substantial movements, adjustment and feed movements that are necessary for machining are carried out by the tool slide 1.9, in particular also the movement in the Z axis 1.10, parallel to the center of the spindle and automatic lathe.

A sliding headstock automatic lathe, as shown for example in FIG. 8, substantially differs from the fixed headstock automatic lathe in two respects. On the one hand, the headstock 2.1 can be moved in the direction of the Z axis 2.2. This movement is carried out by a separate, usually NC-controlled drive shaft. Machining operations in the direction of the Z axis, e.g. longitudinal turning processes, are in this case carried out by the headstock movement, the headstock including a rotatably driven hollow spindle 2.11, at the tool or process chamber end of which a collet 2.4 is provided, with which a material bar 2.8 guided from the loading magazine 2.6 through the spindle 2.11 is clamped. The tool 2.3 arranged in the process chamber of the automatic lathe only performs approach and adjustment movements in the X and Y directions. The feed movements in the direction of the Z axis necessary for the longitudinal turning process are carried out by moving the headstock and material bar against a tool that is stationary in the Z-direction. Furthermore, as shown in FIG. 8, sliding headstock automatic lathes have, in addition to the collet 2.4, a guide bush 2.5 that is fixed in the Z direction and used to guide the material bar. In addition to a bar-guiding channel, the loading magazine comprises a push rod driven in the Z direction, at the end of which a clamping sleeve 2.9 is provided for receiving the material bar. Using the push rod, the automatic lathe is loaded and the material bars are fed. In order to prevent the material bar 2.8 from being pulled out of the clamping sleeve 2.9 on the push rod side during the longitudinal movements of the material bar caused by the headstock movements, a switchable synchronization device

2.7 is provided in the loading magazine. Using this device, the movements of the push rod are synchronized with those of the material bar.

As a more recent development, an automatic lathe has become established on the market that is also referred to below as a hybrid automatic lathe. Such a hybrid automatic lathe, which substantially combines fixed headstock and sliding headstock automatic lathes, as shown, for example, in FIG. 9, works with a movable headstock 3.1. The structure is based on the concept of a sliding headstock automatic lathe and can also be operated in combination with a guide bush. Optionally, however, the guide bush can be removed in order to approximate the operation of a fixed headstock automatic lathe. This variant is primarily used to shorten the length of the unusable material bar end when manufacturing shorter components and thus to save costs. While the headstock travel is approx. 350 mm (order of magnitude) in sliding headstock automatic lathes, this value is up to 550 mm in the hybrid versions today.

There are also hybrid automatic lathes that are designed exclusively without a guide bush. In other words, the automatic lathe works substantially like a fixed headstock automatic lathe without the use of the guide bush, but has an NC-controlled headstock that is movable in the Z axis 3.2. Because of the lack of guide bushing, the longitudinal turning processes are modified, and feed movements in the Z axis 3.2 can be performed both via the tool slide 3.3 and via the headstock 3.1.

Loading magazines feed the material bars to the automatic lathe and must guide them safely throughout the entire machining process. The main task is to suppress vibrations. With bar lengths of up to 4 m and diameters from 1 mm to 100 mm, speeds of up to 15,000 rpm can occur, depending on the diameter and bar cross-section (round, tubular, hexagonal or square). It is therefore essential for the prevention and suppression of vibrations to guide the material bars as precisely as possible. This can largely be ensured within the loading magazine via the channel design and by filling the channels with oil. A weak point, however, is the transition region between the loading magazine and the lathe. On the bar outlet side, loading magazines are therefore usually equipped with a steady rest 3.4 (see FIG. 9), which provides another last support point, consisting of an adjustable roller or jaw support. This is followed by a transition tube 3.5 (see FIG. 9), which for sliding headstock and hybrid lathes is usually designed as a telescopic tube 3.5 (or 2.10 in FIG. 8) in order to adapt to the headstock movement, as well as the actual hollow spindle 3.6 (see FIG. 9, but also FIG. 7, 1.2 and FIG. 8, 2.11). At the end of this hollow spindle, where it transitions into the process chamber (see FIG. 7, 1.8), there is the clamping means (see FIG. 7, 1.3 and FIG. 8, 2.4). There is therefore a considerable transition region over which the material bar remains without support. In the case of a transition tube of approx. 400 mm and a spindle length of 800 mm, a size of 1,200 mm and more is often achieved here.

In principle, it would be possible to improve the guidance quality by reducing the diameter of the spindle and the transition tube, but economic reasons often speak against this, as these are parts that would have to be swapped from one workpiece to another during conversion work. In addition, these parts are located in a system region that is difficult to access. For this reason, use is made of this diameter reduction only reluctantly or this diameter reduction is substantially limited to single-purpose machines, which are seldom or never converted. In the case of sliding headstock and hybrid lathes, the transition region is lengthened again by the additional headstock movement such that transitions of up to 1,600 mm in length or more can arise in which the bar remains without support. These transition regions then form the development zones for the occurrence of vibrations, with the result that a reduction in the rotational speed becomes necessary and the productivity of the system suffers.

A substantial starting point for the generation of vibrations is therefore the interaction of a fixed loading magazine and a movable headstock. In order to reduce the distances between the support points, which can lead to the bar swinging up, a loading magazine, as shown, for example, in FIG. 10, has been proposed in accordance with WO 2010/149342 A1. The loading magazine 4.1 has a longitudinally displaceable material bar-guiding channel system 4.2 mounted, for example, on a rail system 4.8, a transition tube 4.9 being provided between the channel system and the headstock 4.10 in order to keep the distance to the spindle, i.e., in particular between the loading magazine and the collet, constant overall in any machining situation. An automatic lathe designed, for example, as a hybrid automatic lathe, has a headstock 4.10 that can be displaced in the direction of the Z axis 4.11 and with which feed movements can be carried out in the direction of the Z axis during machining. The channel system 4.2, which is movable in the longitudinal direction, is divided into an upper channel 4.3 and a lower channel 4.4 for loading with material bars, the upper channel being provided as a channel opening system 4.5. A push rod having a clamping sleeve 4.7 is used to hold a material bar and can be fed to the automatic lathe via a drive 4.6 in the longitudinal direction through the back of the headstock. The channel system 4.2 is connected to the headstock 4.10 in a force-locking manner via the transition tube 4.9 such that the tensile and compressive forces occurring during the headstock movements in the Z direction can be transferred via the transition tube to the channel system, which is also movably mounted in the Z axis.

However, it has been shown that the power to move the additional weight of the channel system cannot be provided by every automatic lathe.

SUMMARY

It is therefore an object of the present invention to show a new, alternative way with which the distance between the channel system and the collet of a sliding headstock or hybrid automatic lathe can be kept at a reduced, in particular constant length over substantially all operating phases, though with a significant weight reduction and thus significantly less force to be applied or power required for this.

According to the invention, this object is achieved in particular by a material bar magazine for guiding material bars on an automatic lathe and by a system comprising such a magazine and automatic lathe having the features according to the pending independent claims, the respective dependent claims each comprising preferred further developments.

The invention consequently proposes a material bar magazine that includes a material bar-guiding channel system having a channel opening system, for guiding material bars on an automatic lathe, in particular for loading and/or unloading the automatic lathe, having at least one headstock that is, in particular, displaceable along a longitudinal axis of the material bar magazine, in which the channel system of the material bar magazine has a first, outer guide channel and a second, inner guide channel mounted inside the first guide channel such that it can move relative thereto along the longitudinal direction, the second, inner guide channel being couplable to the automatic lathe and, as a result of a change in position of the headstock along the longitudinal axis of the material bar magazine, being movable synchronously together therewith along the longitudinal axis and relative to the first guide channel.

Accordingly, the invention also proposes a system having an automatic lathe and a material bar magazine, which contains a material bar-guiding channel system having a channel opening system, for guiding material bars on the automatic lathe, in particular for loading and/or unloading the automatic lathe, having at least one headstock that is, in particular, displaceable along a longitudinal axis of the material bar magazine. The channel system of the material bar magazine has a first, outer guide channel and a second, inner guide channel mounted inside the first guide channel such that it can move relative thereto along the longitudinal direction. The second, inner guide channel is couplable or is already coupled to the headstock of the automatic lathe, which synchronously moves the second, inner guide channel as a result of a change in position of the headstock along the longitudinal axis of the material bar magazine and relative to the first guide channel.

It is therefore advantageous if the headstock is a headstock that can be displaced along a longitudinal axis of the material bar magazine, as is the case with a sliding headstock or hybrid automatic lathe, where the moving headstock moves the second, inner guide channel synchronously relative to the first guide channel when the headstock is coupled with the second, inner guide channel. If, on the other hand, the headstock is a headstock that is substantially stationary along the longitudinal axis of the material bar magazine, as is the case with a fixed headstock automatic lathe, the headstock can prevent the second, inner guide channel from moving relative to the first guide channel.

A further significant advantage is consequently to be seen in the fact that, with the procedure according to the invention, in particular when used with sliding headstock or hybrid automatic lathes, only the second, inner guide channel has to be coupled to a headstock of the automatic lathe that is movable along the longitudinal axis in order to carry out a common synchronous movement and, consequently, a significantly reduced weight is to be moved as an additional load on the headstock or the lathe spindle in order to keep the distance between the channel system and the collet to a reduced, in particular constant length over substantially all operating phases, even in the case of a sliding headstock or hybrid automatic lathe. The guidance of a material bar in the variable transition region can thus be substantially simplified in the case of sliding headstock or hybrid automatic lathes having headstocks that can be moved in the Z axis due to the only second, inner guide channel, which is designed to be movable along the longitudinal axis and consequently to be moved, and, consequently, vibrations can also be substantially reduced and, in particular, any potential vibrations and oscillations can be minimized.

Consequently, a further substantial advantage can also be seen in the fact that the procedure according to the invention can also be used to optimize the mounting situation of the loading magazine on fixed headstock automatic lathes. Even with fixed headstocks, in which, according to the prior art, a transition tube had to be installed between the bar outlet side of the loading magazine and the entrance to the hollow spindle to cover the rotating material bar, such a tube is no longer necessary because the second, inner guide channel that can be moved along the longitudinal axis can be coupled to the headstock of the automatic lathe. Because such transition tubes were usually initially manufactured in universal lengths and still are being manufactured in universal lengths and then had to be or have to be shortened to the specific distances depending on the length determined by the lathe design during commissioning, this additional effort can be eliminated in the case of fixed headstock automatic lathes due to the second, inner guide channel that can be moved along the longitudinal axis and therefore flexibly be extended, and the commissioning can thus be facilitated.

It is also advantageous that the material bar magazine is suitable both for loading an automatic lathe, i.e., in particular as a loading magazine, and for unloading the automatic lathe, i.e., in particular as an unloading magazine, within the scope of the invention.

BRIEF DESCRIPTION OF THE DRAWINGS

Further advantages and features of the invention, in particular also of preferred embodiments and developments indicated in the dependent claims, will be described in more detail on the basis of the following description with reference to the accompanying drawings. In the drawings:

DETAILED DESCRIPTION

A detailed description of preferred embodiments within the scope of the invention follows with reference to the accompanying drawings.

Figure 1:
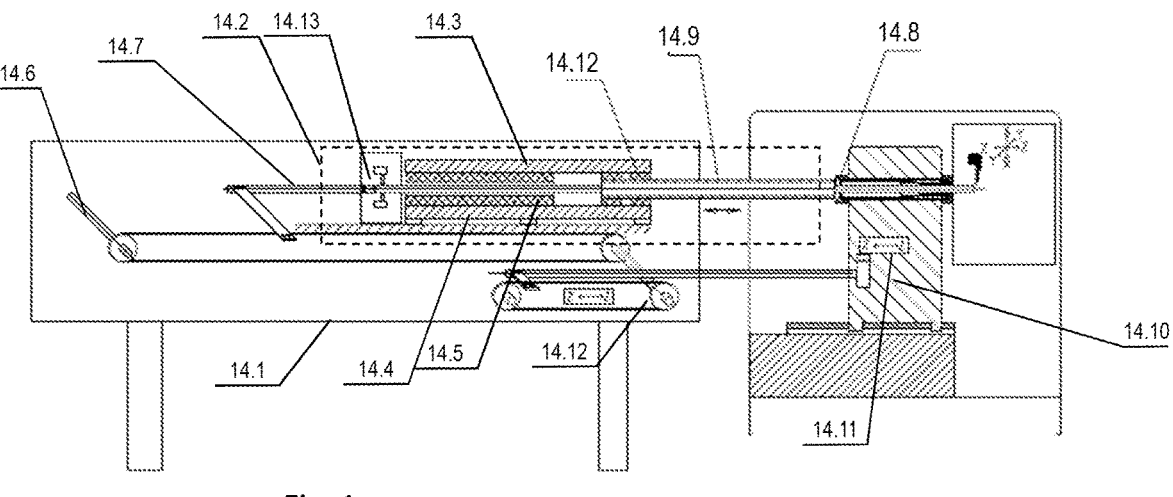
FIG. 1: shows a first embodiment of the invention having a second, inner guide channel of a material bar magazine mounted inside a first guide channel such that it can move relative to the first guide channel along the longitudinal direction

FIG. 1 is a schematic cross section through a material bar magazine 14.1 having a material bar-guiding channel system 14.2 for guiding material bars on an automatic lathe, in particular for loading and/or unloading the automatic lathe. As can be seen, the material bar magazine 14.1 shown there is used as a loading magazine and is therefore also referred to below as a loading magazine for short. According to the present invention, the bar-guiding channel system includes a first, outer guide channel 14.3, 14.4 and a second, inner guide channel 14.9 mounted inside the first guide channel such that it can be moved along the longitudinal direction, the second, inner guide channel 14.9 being coupled to the headstock 14.10 of the automatic lathe 14.8, so that the second, inner guide channel 14.9 synchronously moves with the headstock 14.10 along a longitudinal Z axis 14.11 of the material bar magazine and relative to the first guide channel as shown in FIG. 1. The second, inner guide channel 14.9 can therefore basically expediently be pulled out flexibly and, in the figures, is designed in the particularly preferred form of a tube, but can alternatively also be designed as a channel that is open at the top.

In the right part of the drawing, the automatic lathe is indicated, which is expediently designed as a sliding headstock or hybrid automatic lathe and which, as already described above, thus has a headstock 4.10 that can be displaced along the Z axis 4.11, i.e. along the longitudinal axis of the material bar magazine 14.1 during a machining process, with which headstock the feed movements in the direction of the Z-axis can be carried out at least in part in the case of a hybrid automatic lathe and substantially completely in the case of a sliding headstock automatic lathe.

Because, as can be seen and as described in more detail below, in the present example there is a coupling between the second, inner guide channel, which is mounted inside the first guide channel such that it can be moved relative thereto along the longitudinal direction, and the headstock for feeding material bars and loading the automatic lathe, such a headstock is also referred to as the main headstock.

Figures 2A, 2B:
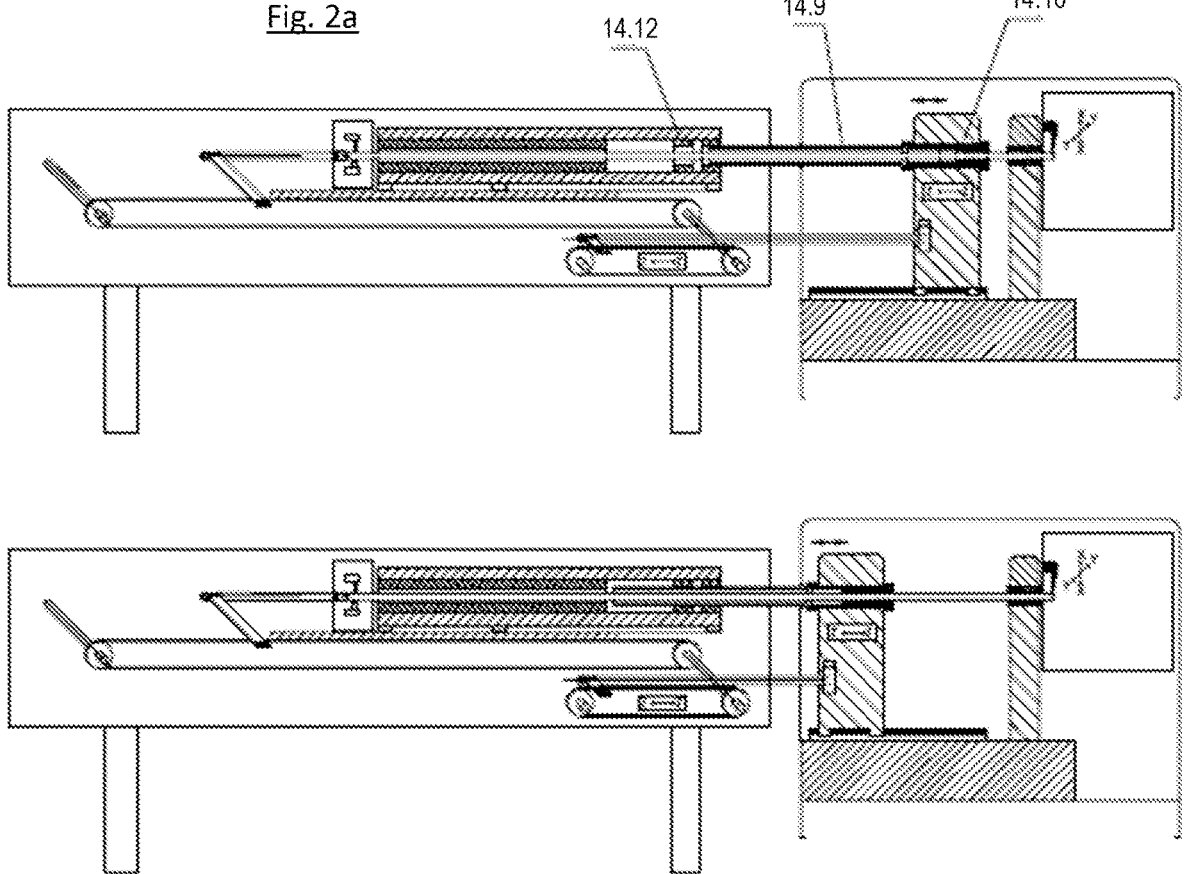
FIG. 2a, 2b: are each an illustration of an embodiment similar to FIG. 1 in a first position in which the second guide channel is at least in part extended from the first guide channel and a second position in which the second guide channel is substantially maximally retracted into the first guide channel.
Figure 5:
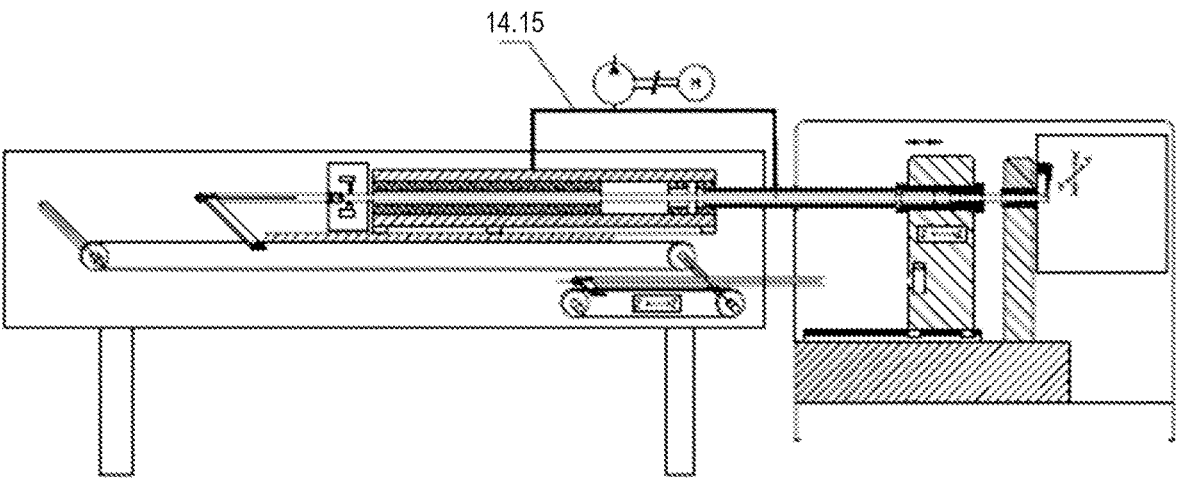
FIG. 5: shows a further embodiment of the invention having a longitudinally displaceable second, inner guide channel of a material bar magazine, which second, inner guide channel is mounted inside a first guide channel such that it can be moved relative thereto along the longitudinal direction, the material bar magazine having a hydraulic or pneumatic supply system that communicates with the passage of the second, inner guide channel for guiding the material bars in order to provide a slide bearing for material bars guided through the inner guide channel.

The second, inner guide channel 14.9, which is mounted inside the first guide channel 14.3, 14.4, is consequently movable between a first position in which the second guide channel is maximally retracted and a second position in which the second guide channel is maximally extended out of the first guide channel. FIG. 2a, 2b are each an illustration of the embodiment according to FIG. 1 in a position in which the second guide channel is at least in part or largely extended out of the first guide channel and a position in which the second guide channel is substantially maximally retracted into the first guide channel. As can be seen, as a result of a change in position of the headstock along the longitudinal Z axis of the material bar magazine, the second, inner guide channel, which is coupled with the headstock, moves between the first position (see also FIG. 2b) and the second position (see also FIG. 2a) synchronously with the headstock along the longitudinal axis and relative to the first guide channel. For mounting 14.5 the inner guide channel in the outer guide channel, an antifriction bearing or roller bearing, for example, can be arranged therein. Additionally or alternatively, a slide bearing can also be provided for mounting the inner guide channel in the outer guide channel, the material bar magazine expediently comprising a pneumatic or hydraulic supply system that communicates with the passage of the outer guide channel in which the inner guide channel is mounted. For the sake of clarity, however, such a supply system is merely indicated in the further embodiment according to FIG. 5 (see reference sign 14.15)

but otherwise not shown in more detail in the figures and can otherwise be designed differently in principle depending on the specific embodiment, as is evident to a person skilled in the art based on this disclosure. In this case, the supply system indicated in FIG. 5 is expediently configured to also communicate with the passage of the inner guide channel.

To support the movable, i.e. in particular also flexibly extendable, second, inner guide channel 14.9 mounted inside the first guide channel 14.3, 14.4, a support device 14.12, through which the inner guide channel 14.9, which is mounted inside the first guide channel, extends permanently, can, in a further preferred embodiment, for example according to FIG. 1, be arranged in the end region of the first guide channel 14.3, 14.14 facing in the direction of the headstock, in particular on the material bar outlet side of said guide channel.

The channel system 4.2 included in the loading magazine 4.1 shown in FIG. 1, in which a material bar is guided or stored, expediently has, as a first, outer guide channel 14.3, 14.4, a guide channel that can be opened for loading with material bars. For this purpose, it can preferably be provided in the context of a channel opening system that the first, outer guide channel is subdivided into an upper channel 14.3 and a lower channel 14.4, it being possible for the upper channel to be lifted from the lower channel, for example, to open the channel.

The second, inner guide channel 14.9, which can be coupled or, according to FIG. 1 (see reference sign 14.8) is coupled, to the headstock 14.10 of the automatic lathe, is expediently supplied with a hydraulic fluid, in particular oil, or a pneumatically usable gas, which is subjected to turbulence during the turning process due to the rapidly rotating material bars, thin material bars in particular experiencing further improved guidance due to the eddies formed in the center of the channel. Such a liquid or gas distribution integrated into the second, inner guide channel consequently makes it possible to bring the associated positive effects for vibration damping close to the spindle end.

A hydraulic or pneumatic supply system, which is thus expediently comprised by the material bar magazine and which communicates with the passage of the second, inner guide channel for guiding the material bars to provide a slide bearing for the material bars guided through the inner guide channel, is, for the sake of clarity, merely indicated in FIG. 5 (see reference sign 14.15) but otherwise not shown in more detail in the figures and can otherwise be designed differently in principle depending on the specific embodiment, as is evident to a person skilled in the art based on this disclosure. In this case, the supply system indicated in FIG. 5 is also expediently configured to also communicate with the passage of the outer guide channel in which the inner guide channel is mounted.

In the figures, the coupling of the second, inner guide channel 14.9 to the headstock 14.10 of the automatic lathe is indicated by a mechanical connection and expediently produces a force-locking connection between the two units. Additionally or alternatively, the second, inner guide channel 14.9 can also be driven by an NC axis or a linear motor, the NC axis or linear motor expediently being controlled by the automatic lathe and the headstock being coupled to the second, inner guide channel by means of an electronic connection.

Such an NC axis or a linear motor can also contribute in the manner of a servo drive to reducing the forces to be applied by the headstock. In this case, the drives can also be operated without an NC control, the drive being possible directly through the loading magazine.

If, on the other hand, the headstock is a headstock that is substantially stationary along the longitudinal axis of the material bar magazine, as is the case in particular with a fixed headstock automatic lathe, the headstock can prevent the second, inner guide channel from moving relative to the first guide channel. In other words, if the movement of the headstock is zero in this case, i.e., if the headstock is not moved, the consequent movement of the second, inner guide channel synchronously along the longitudinal axis and relative to the first guide channel will also be zero, i.e., the second, inner guide channel is not moved. In any case, however, there is no need for an additional transition tube between the magazine and the headstock.

The material bar magazine shown in particular in FIG. 1 also includes a push rod 14.7, in particular having a gripper or a clamping sleeve 14.13, with which a material bar is held and can be fed to the automatic lathe, for example via a drive 14.6, in the longitudinal direction through the back of the headstock. The push rod 14.7 can thus be moved along the longitudinal axis, in particular coaxially to the longitudinal axis of a respectively guided material bar, and is suitable for advancing the material bars. In particular, in order to be able to push the end of the material bar away from the headstock as far as possible in the direction of the headstock, the inner, second guide channel 14.9 mounted inside the first guide channel expediently provides a passage for guiding the material bars with an opening width through which the push rod can also extend or the push rod 14.7 is expediently dimensioned in its cross section in such a way that it can also extend through the opening width of the passage of the inner guide channel 14.9 when a respective material bar is advanced.

In a practical embodiment, the push rod or the drive 14.6 can also be expediently moved independently of the second, inner guide channel 14.9. A synchronization device 14.12 (see FIG. 1) can also be used for additional coordination of the bar movement, in particular to avoid path inaccuracies when the bars are advanced.

In particular, in order to counteract any signs of wear of the second, inner guide channel due to the guiding of the material bars, the interior of said second, guide channel, but particularly preferably also the interior of the first guide channel, is provided with an insert 14.16 made of low-wear material, for example in the form of a protective layer made of a resistant material. Due to its excellent mechanical properties, polyurethane, for example, is suitable as such a resistant material for a protective layer arranged in the inner channel. Additionally or alternatively, the inner wall of said second guide channel can also be lined with a special vibration-damping material layer as an insert 14.16 or can include such a vibration-damping material as an insert 14.16.

Figure 6:
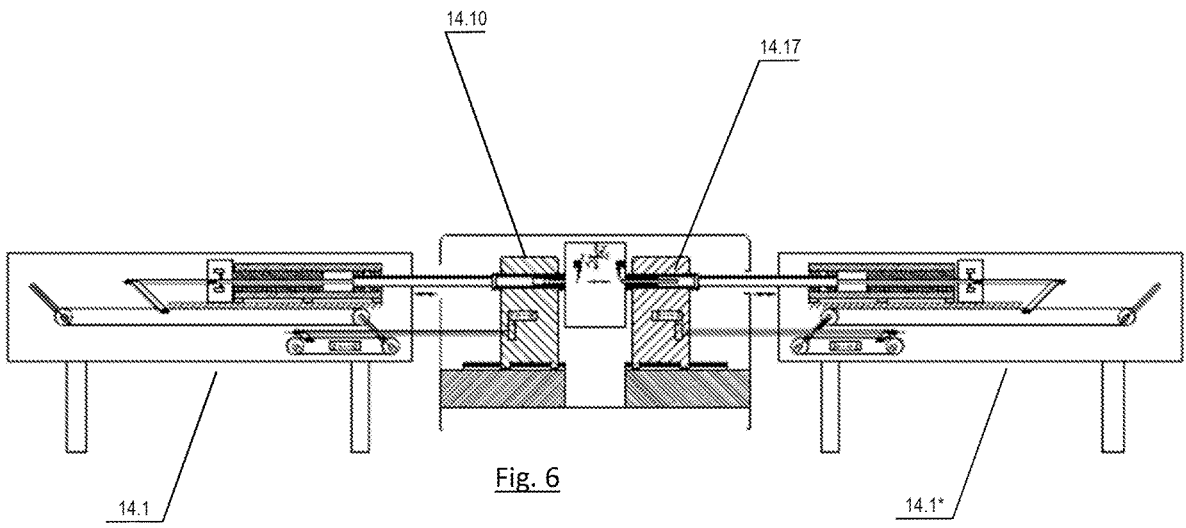
FIG. 6: shows a further embodiment of the invention having an additional unloading device on a counter-headstock of an automatic lathe.
Figure 7:
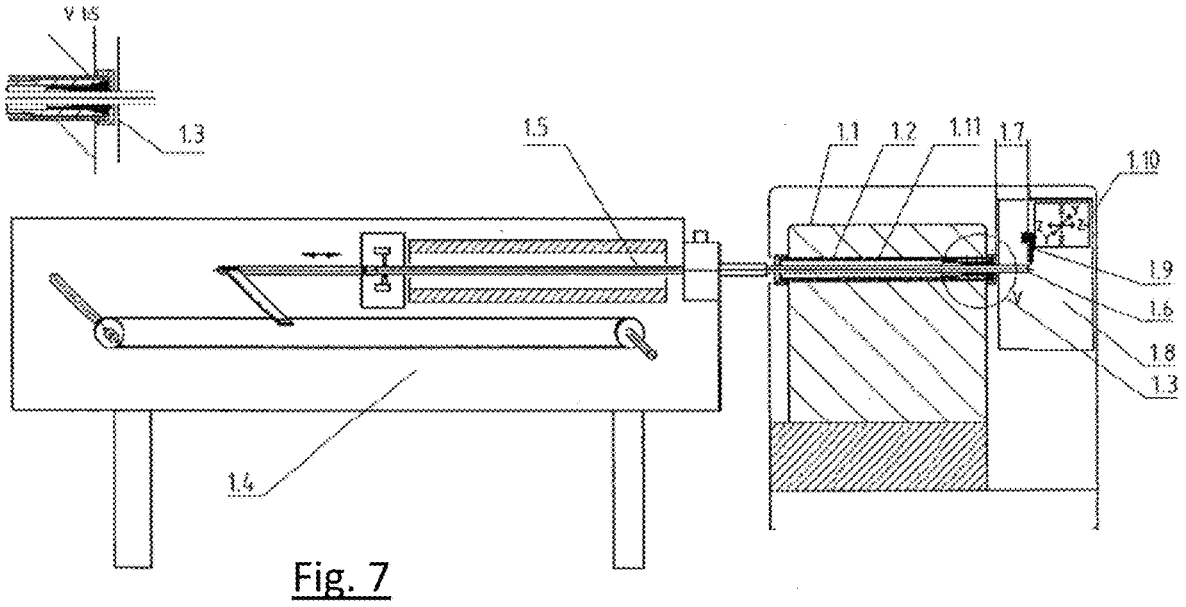
FIG. 7: shows a fixed headstock automatic lathe having a loading magazine according to the prior art.
Figure 8:
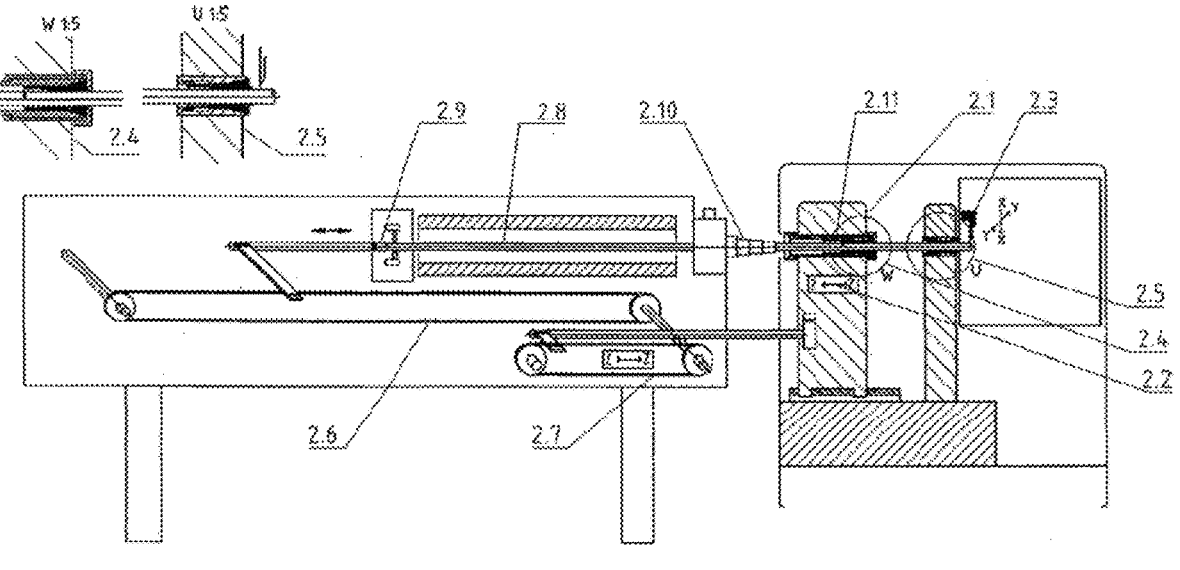
FIG. 8: shows a sliding headstock automatic lathe having a loading magazine according to the prior art.
Figure 9:
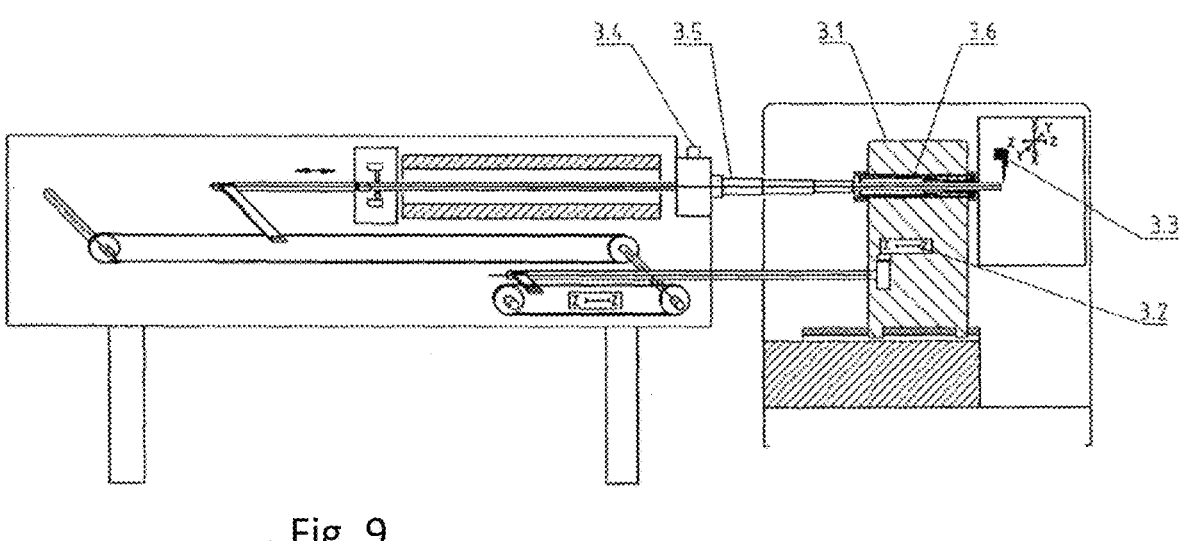
FIG. 9: shows a hybrid automatic lathe having a loading magazine according to the prior art.
Figure 10:
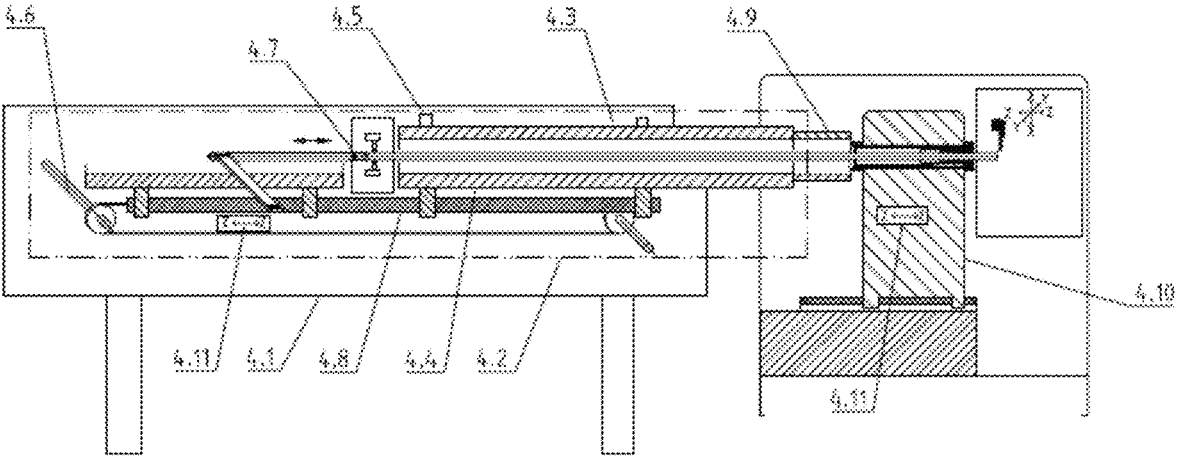
FIG. 10: shows an automatic lathe having a loading magazine having a longitudinally displaceable guide channel according to the prior art.

As shown in FIG. 6, automatic lathes are often equipped with a counter-headstock 14.17, which is used for machining the back of workpieces.

Such a counter-headstock takes over the workpieces when the headstock 14.10 or main headstock of the automatic lathe moves in the Z-direction. A finished workpiece is usually removed through a hollow bore in the spindle, for example by sliding a spring-loaded clamping sleeve over the end of the workpiece, which is attached to a push rod. During removal, the clamping device of the counter-headstock opens such that the workpiece is pulled back through the spindle. As is known, the construction of a device for unloading provided on a counter-headstock can be very similar to a loading magazine for feeding. For certain applications, especially when machining workpieces that are significantly longer than the spindle, the same or at least similar functionalities are therefore usually required on the counter-headstock side as for the loading magazines on the main headstock side for loading the automatic lathe.

As shown in FIG. 6, a material bar magazine according to the invention is preferably also to be used for leading out material bars and unloading the automatic lathe, because the same vibration problems and connection problems exist as on the loading side due to the counter-headstock 14.17 that can be moved in the Z direction.

FIG. 6 thus shows a particularly preferred system that has an automatic lathe, a first material bar magazine 14.1 used as a loading magazine, and a second material bar magazine 14.1 used as an unloading magazine, the loading magazine, however, being coupled to a headstock 14.10 of the automatic lathe designed as a main headstock and the second being coupled to a headstock designed as a counter-headstock 14.17.

Figure 3:
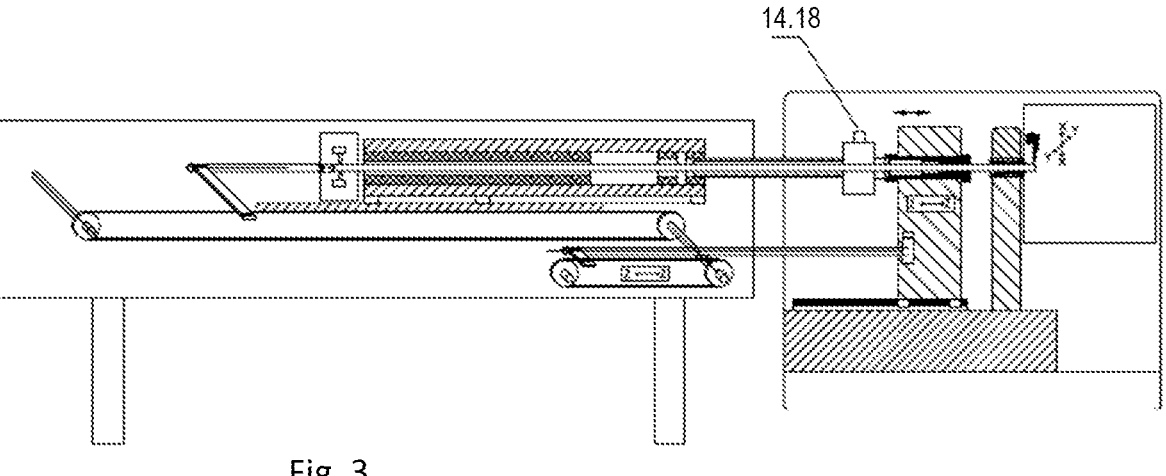
FIG. 3: shows a further embodiment of the invention having a steady rest for further support of a material bar between the end of a second, inner guide channel and headstock.
Figure 4:
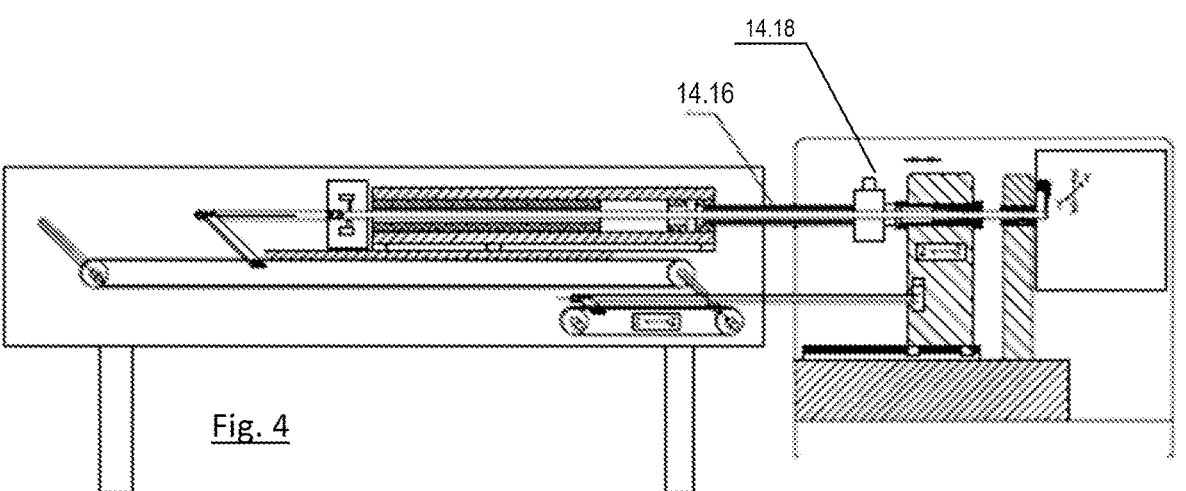
FIG. 4: shows a further embodiment of the invention having a steady rest similar to FIG. 3 and having an insert within a second guide channel made of low-wear material.

FIGS. 3 and 4 also show an embodiment of a system according to the invention having a loading magazine, a steady rest 14.18 additionally being provided at the end of the inner guide channel facing in the direction of the headstock on the side facing the material bar magazine. Another advantage here is that a steady rest, which is usually used as the last support point of the material bar, moves as close as possible to the end of the spindle and, using the invention, can consequently move even closer and thus again significantly reduce the potential for the material bar to swing out. Such a steady rest thus forms another final support point for the material bars, it being possible for said steady rest to be designed in an expedient manner to have adjustable roller or jaw supports. Additionally or alternatively, such a steady rest, or a steady rest designed in a similar manner, can also be provided directly on the headstock.

From the above description it is evident that, with the loading magazine according to the invention and the system according to the invention, the distance between the guide elements, i.e., in particular the second, inner guide channel and possibly the steady rest, the loading magazine and collet of the headstock is significantly reduced and remains constant throughout all operating phases, even in the case of the use of movable headstocks, such that the possibilities for the generation of vibrations are significantly further restricted.

The invention claimed is:

1. A system comprising:
an automatic lathe having at least one headstock; and
a material bar magazine having a longitudinal axis, the material bar magazine for guiding material bars on the automatic lathe and loading and/or unloading the automatic lathe, the at least one headstock of the automatic lathe being displaceable along the longitudinal axis of the material bar magazine;
wherein the material bar magazine includes a material bar-guiding channel system having a channel opening system, the channel opening system having a first, outer guide channel and a second, inner guide channel mounted inside the first, outer guide channel such that the second, inner guide channel can move relative thereto along a longitudinal direction, with the second, inner guide channel coupled to the headstock of the automatic lathe such that the second, inner guide channel synchronously moves with the headstock as the headstock is displaced along the longitudinal axis of the material bar magazine and relative to the first, outer guide channel; and wherein the second, inner guide channel mounted inside the first guide channel can be moved between a first position in which the second guide channel is maximally retracted and a second position in which the second guide channel is maximally extended out of the first guide channel.

2. A system comprising:
an automatic lathe having at least one headstock; and
a material bar magazine having a longitudinal axis, the material bar magazine for guiding material bars on the automatic lathe and loading and/or unloading the automatic lathe, the at least one headstock of the automatic lathe being displaceable along the longitudinal axis of the material bar magazine;
wherein the material bar magazine includes a material bar-guiding channel system having a channel opening system, the channel opening system having a first, outer guide channel and a second, inner guide channel mounted inside the first, outer guide channel such that the second, inner guide channel can move relative thereto along a longitudinal direction, with the second, inner guide channel coupled to the headstock of the automatic lathe such that the second, inner guide channel synchronously moves with the headstock as the headstock is displaced along the longitudinal axis of the material bar magazine and relative to the first, outer guide channel.

3. The system according to claim 2, wherein the second, inner guide channel is coupled to the headstock of the automatic lathe by a mechanical connection and is connected thereto in a force-locking manner, and/or wherein the second, inner guide channel is driven by an NC axis or a linear motor, the control of the NC axis or the linear motor carried out by the automatic lathe and the headstock coupled to the second, inner guide channel by an electronic connection.

4. The system according to claim 2, wherein a support device is arranged in the first, outer guide channel at an end region thereof, which faces the headstock, the support device supporting the second, inner guide channel as it moves within the first, outer guide channel.

5. The system according to claim 2, wherein the material bar magazine comprises a push rod that is movable along a longitudinal axis and is for advancing the material bars and wherein the inner guide channel mounted inside the first guide channel provides a passage for guiding the material bars having an opening width through which the push rod can also extend.

6. The system according to claim 5, wherein the push rod is movable independently of the second, inner guide channel.

7. The system according to claim 2, wherein a steady rest is additionally provided on the end of the inner guide channel facing in the direction of the headstock or on the headstock on the side facing the material bar magazine, which steady rest forms an adjustable roller or jaw supports as a further last support point of the material bars.

8. The system according to claim 2, wherein the at least one headstock is configured only for feeding material bars and loading the automatic lathe with material bars.

9. The system according to claim 2, wherein the material bar magazine has a hydraulic or a pneumatic supply system that communicates with the passage of the inner guide channel for guiding the material bars in order to provide a slide bearing for the material bars guided through the inner guide channel.

10. The system according to claim 2, wherein an antifriction bearing or roller bearing is arranged in the outer guide channel for mounting the inner guide channel.

11. The system according to claim 2, wherein a slide bearing is provided for mounting the inner guide channel in the outer guide channel, the material bar magazine comprising a pneumatic or hydraulic supply system that communicates with the passage of the outer guide channel in which the inner guide channel is mounted.

12. The system according to claim 2, wherein the inner wall of the second guide channel is lined with a layer of vibration-damping and/or resistant material and/or integrally comprises a vibration-damping and/or resistant material.

13. The system according to claim 2, wherein the material bar magazine is coupled or can be coupled to a headstock of the automatic lathe designed as a counter-headstock for removing material bars and unloading the automatic lathe.

14. A material bar magazine for guiding, loading, and/or unloading material bars on an automatic lathe having at least one headstock, the material bar magazine comprising:
a material bar-guiding channel system; and
a longitudinal axis along which the at least one headstock of the automatic lathe is displaceable;
wherein the material bar-guiding channel system includes a channel opening system having a first, outer guide channel and a second, inner guide channel mounted inside the first, outer guide channel such that the second, inner guide channel can move relative thereto along a longitudinal direction, the second, inner guide channel being couplable to the headstock of the automatic lathe and, as a result of the displacement of the headstock along the longitudinal axis of the material bar magazine, the second, inner guide channel synchronously moves along the longitudinal axis and relative to the first guide channel.

* * * * *